United States Patent [19]

Meyer

[11] Patent Number: 4,951,244

[45] Date of Patent: Aug. 21, 1990

[54] LINEAR INTERPOLATION OPERATOR

[75] Inventor: Jacques Meyer, Corenc, France

[73] Assignee: SGS-Thomson Microelectronics S.A., Gentilly, France

[21] Appl. No.: 262,306

[22] Filed: Oct. 25, 1988

[30] Foreign Application Priority Data

Oct. 27, 1987 [FR] France .................. 87 15242

[51] Int. Cl.$^5$ .......................................... B06F 15/353
[52] U.S. Cl. ................................................ 364/723
[58] Field of Search ............. 364/723, 413.18, 474.31, 364/513; 315/573, 568.15

[56] References Cited

U.S. PATENT DOCUMENTS

| Re. 30,132 | 10/1979 | Irie | 364/513 |
| 3,789,203 | 1/1974 | Catherall et al. | 364/723 |
| 3,943,343 | 3/1976 | Irie | 364/513 |
| 4,001,565 | 1/1977 | Kawai | 364/723 |

Primary Examiner—Dale M. Shaw
Attorney, Agent, or Firm—Lowe, Price, LeBlanc, Becker & Shur

[57] ABSTRACT

A linear interpolation operator for determining the value y of a function of x when one knows the value $y_1$ corresponding to $x_1$, and a value $y_2$ corresponding to $x_2$ (where $x_2 > x \geq x_1$), comprises a first calculation circuit which determines the equation $(x_m + x_M)/2$; a second calculation which determines the equation $(y_m + y_M)/2$; a comparison circuit which compares x with $(x_m + x_M)/2$ so as to determine which one of the intervals $[x_m, (x_m + x_M)2]$, $[(x_m + x_M)/2, x_M]$ contains x and to feed back the limits of the selected interval into the first calculation circuit and the limits of the interval corresponding in y into the second calculation circuit.

5 Claims, 3 Drawing Sheets

LINEAR INTERPOLATION OPERATOR

BACKGROUND OF THE INVENTION

The instant invention relates to a linear interpolation operator, that is, a calculation device permitting, if one considers that a value y is a linear function of x and if one knows the values of y ($y_1$ and $y_2$) corresponding to two specific values of x ($x_1$ and $x_2$), to calculate the value of y corresponding to any given value of x included within the interval [$X_1$, $x_2$].

Such a linear interpolation operator is especially implemented in the field of synthesis graphic devices of bi- or tri-dimensional images for line plotting, Gouraud smoothing, Phong smoothing, S-plines, ray tracing and more generally for signal digital processing.

In mathematical form, a linear interpolation is written as follows:

$$y=y_1+(x-x_1)(y_2-y_1)/(x_2-x_1) \quad (1)$$

On the other hand, the object of the instant invention is to resolve calculations of the type $$y=(aA+bB)/(a+b) \text{ and } A*B/C.$$

According to the prior art, all those calculations require the use of calculation devices, softwares or hardwares, using a computation time period equal to that of about three multiplications (generally, the division duration is substantially equal to that of two multiplications).

SUMMARY OF THE INVENTION

An object of the instant invention is to provide for a linear interpolation operator permitting to carry out the abovementioned calculations (and analog and derived calculations) within a period of time equal to that of one multiplication.

In order to achieve this purpose, the instant invention provides for a linear interpolation operator so as to determine the value y of a function x when one knows the value $y_1$ corresponding to $x_1$, and a value $y_2$ corresponding to $x_2$ ($x_2 > x_1$), comprising first calculation means for ($x_m+x_M$)/2, (with $x_m < x_M$, initial value of $x_m=x_1$, initial value of $x_M=x_2$); second calculation means of ($y_m+y_M$)/2, (initial value of $y_m=y_1$, and initial value of $y_M=y_2$); comparison means of x with ($x_m+x_M$)/2 for determining which one of the intervals [$x_m,(x_m+x_M)/2$], [($x_m+x_M$)/2, $x_M$] comprises x and for feeding back the limits of the selected interval into the first calculation means and the interval limits corresponding in y into the second calculation means; and output means supplying as the wished value y the output of the second calculation means after a determined number of cycles.

Thus, according to the instant invention, successive multiplication operations are replaced by operations of the logic type, the number of which is roughly equal to that of one operation. Moreover, the hardware constituting the operator is substantially simplified with respect to the devices according to the prior art.

Moreover, it will be noted that the operator according to the instant invention is liable to be implemented in various ways, for example by a software or by various types of wired devices.

BRIEF DESCRIPTION OF THE DRAWINGS

Those objects, features, advantages and others of the instant invention will clearly appear from the following detailed description of preferred embodiments, in connection with the attached drawings, wherein.

DETAILED DESCRIPTION OF THE DRAWINGS

Figure 1:
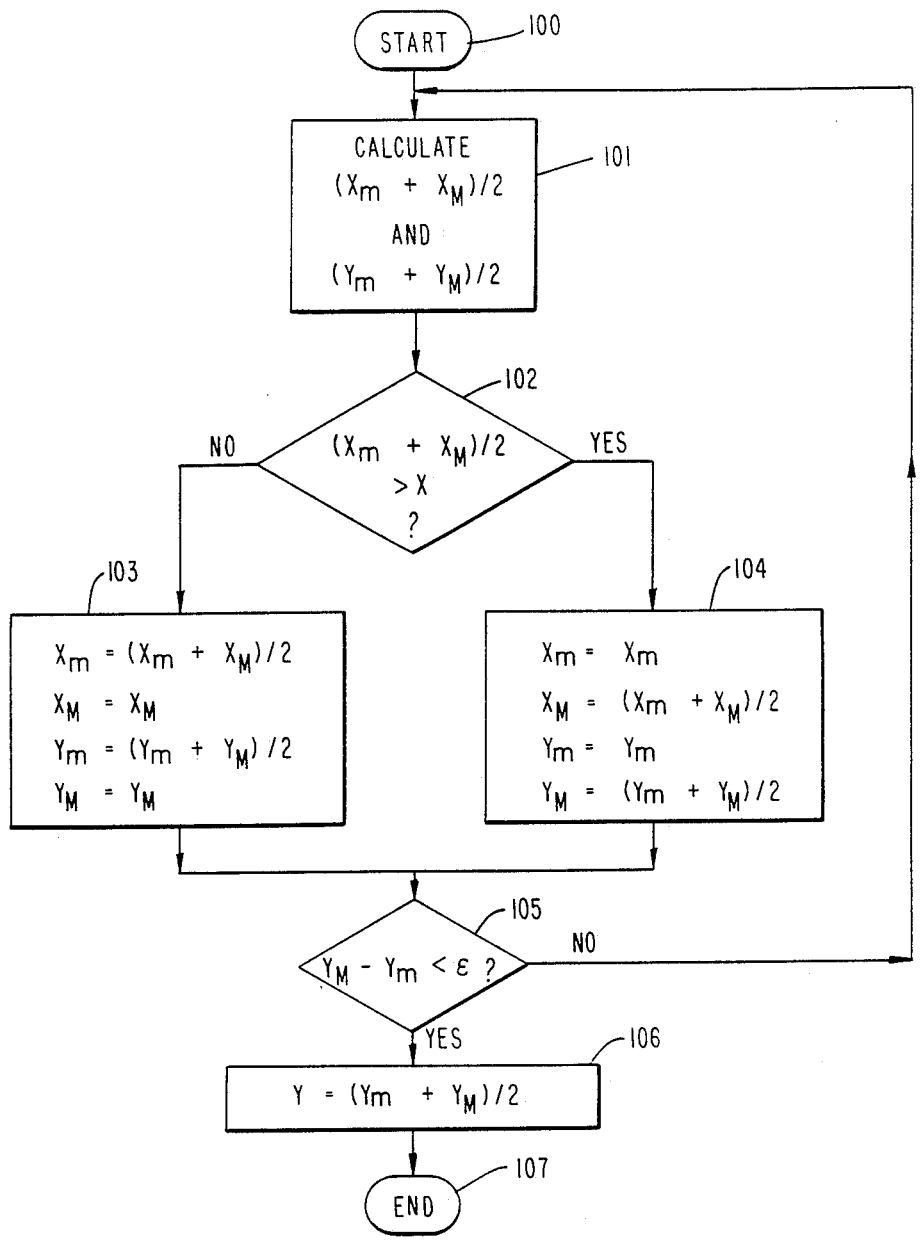
FIG. 1 is a flow chart illustrating the process implemented by an operator according to the instant invention.

As shown in FIG. 1, the flow chart of the process according to the instant invention starts with an initializing block 100 wherein the initial data $x_1$, $x_2$, $y_1$, $y_2$ and x are introduced. In block 101, the half sum ($x_m+x_M$)/2 of the minimum and maximum values of x, is calculated, in the present case, at first, ($x_1+x_2$/2; and at the same time ($y_m+y_M$)/2, initially ($y_1+y_2$)/2, is calculated.

In block 102, it is determined whether ($x_m+x_M$)/2 is higher than x. If the answer is NO, the block 103 is selected and it is considered that the new value of $x_m$ is ($x_m+x_M$)/2, that the value of $x_M$ remains unchanged, that the new value of $y_m$ is ($y_m+y_M$)/2 and that $y_M$ remains unchanged. If the answer is YES, the block 104 is selected where it is determined that $x_m$ remains unchanged, that the new value of $x_M$ is ($x_m+x_M$)/2, that $y_m$ remains unchanged and that the new value of $y_M$ is ($y_m+y_M$)/2.

In block 105, it is determined whether the difference between the new value of $y_M$ and the new value of $y_m$ is lower than a predetermined threshold $\epsilon$. If the answer is NO, the block 101 is selected again and the cycle is repeated. If the answer is YES, a result $y=(y_m+y_M)/2$ is supplied to the block 106 and the calculation is completed at the end block 107.

Figure 2:
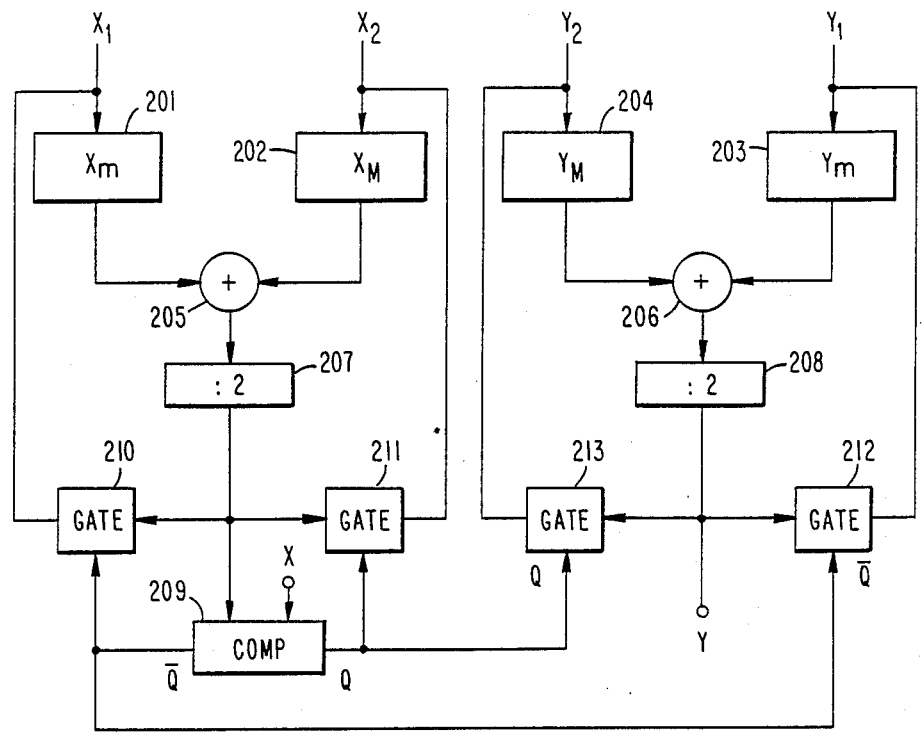
FIG. 2 schematically shows the operation of the operator according to the instant invention.
Figure 3:
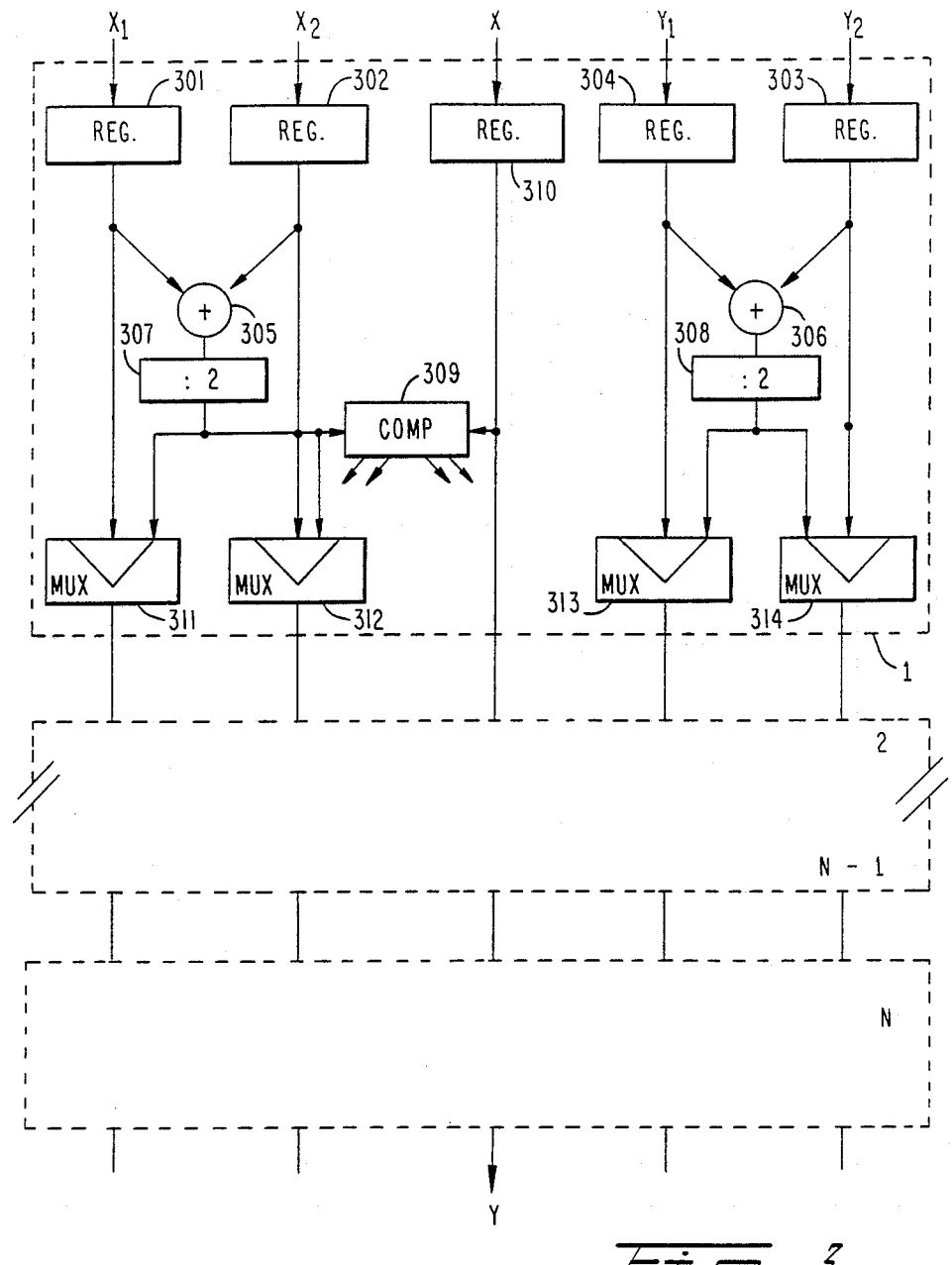
FIG. 3 illustrates an operator in the form of a synchronous operating wired device.

The method corresponding to the flow chart of FIG. 1 is liable to be implemented by software means or by hardware means. FIGS. 2 and 3 illustrate examplary implementations of the process according to the instant invention by hardware.

The algorithmic operator shown in FIG. 2 is directly derived from the flow chart of FIG. 1. In FIG. 2, four registers 201, 202, 203 and 204 are initially provided for and are designed so as to respectively receive the values $x_m$, $x_M$, $y_m$, $y_M$, that is, initially, the values $x_1$, $x_2$, $y_1$, $y_2$. Summation devices 205 and 206 respectively compute the sum of the values $x_m+x_M$ and $y_m+y_M$. The summation results are divided by two in the respective dividers 207 and 208. A comparator 209 compares the output of the divider 207 with the value x for which the equivalent value y is expected. According to the result of the comparison, gates 210 and 211 transmit the output of the divider by two 207 towards the register 201 or 202, the content of the other register being unchanged and, at the same time, the gates 212 and 213 transmit the output of the divider by two 208 towards the register 203 or 204, while the other register stores the preceding unchanged value. In FIG. 2, the clock means designed for synchronizing the operation of the various registers are not shown, this process being well known by those skilled in the art. The means designed to ensure the end of cycle and the supply of the output signal y of the divider by two 208, at a given time, when the iteration has been processed during a sufficient number of cycles, are not shown either.

This end of cycle can be determined by the systematic choice of a predetermined number of cycles, by a comparison between the values $y_M$ and $y_m$, or by a comparison between one and/or the other of the values $x_m$ and $x_M$ with respect to a value x.

It will be noted that the only calculations carried out by the operator shown in FIG. 2 are an addition and a division by 2, those operations being particularly simple in the binary system, and the duration of a number N of additions corresponds to the duration of one multiplication of N-bits numbers.

FIG. 3 shows an alternative embodiment of the instant invention wherein, instead of using N operating cycles of an operator such as the one shown in FIG. 2, a N-stages pipe-line operator is used. Data can then be successively introduced into the first stage according to the rate of a clock while the successive results are obtained at the N-th stage. Each stage comprises input registers 301 to 304 corresponding to the registers 201 to 204 of FIG. 2, adders 305 and 306 corresponding to adders 205 and 206, dividers by two 307 and 308 corresponding to dividers 207 and 208, and a comparator 309 corresponding to the comparator 209. The comparator 309 receives the value x from a fifth input register 310. This comparator supplies control signals to steering circuits 311 to 314, each of which supplies, according to the result of the comparison, either the output of the corresponding input register or the output of the divider 307 or 308, that is, the half sum of the contents of the input registers.

All the following stages (2 to N) are identical to the first one and the value y to be calculated is obtained at the output of the last stage.

As in the preceding case, this circuit is provided with clock means for its synchronization.

It will be noted that, instead of providing a pipeline operator with intermediate registers, it is possible to provide an asynchronous operator but, in this case, it would be compulsory to wait, each time, for the results of the calculations of the N stages before carrying out a new operation.

Of course, the operators illustrated in FIGS. 2 and 3 are liable to numerous variations.

The invention is particularly advantageous with respect to the prior art systems when it is necessary to simultaneously interpolate several variables as a function of the variation of a same parameter. This is especially the case for tridimensional graphic applications wherein one tries to interpolate a dimension z at the same time as the dimension y and/or in the case of multicolor images, for example, for interpolating simultaneously the space coordinates y and z and three color parameters: R (red), Y (yellow) and B (blue). To achieve this purpose, one will add to the features of FIGS. 2 and 3, further to the y calculation block, a calculation block for each of the other parameters, controlled by the same comparator output signal (respectively 209 and 309).

On the other hand, as hereinabove mentioned, such operators permit, owing to an adequate selection of the input values, to carry out calculations other than linear interpolation calculations, for example barycentric calculations or quotients of two products. It is moreover apparent that, if it is possible to carry out the operation A*B/C, it is also possible to carry out the operations A/C, A/B and 1/C. It does not seem to be appreciably advantageous to use an operator according to the instant invention for carrying out such operations but it is a positive quality of this operator to offer a high flexibility and to permit to carry out various types of calculations.

For a barycenter calculation, that is, $y=(aA+bB)(A+B)$, the following values will be chosen as input parameter values:

$$x_1 = 0;\ x_2 = a+b;\ y_1 = A;\ y_2 = B \text{ and } x = b.$$

Then, one effectively obtains by using the formula (1):

$$\begin{aligned} y &= A + (b - 0)(B - A)/(a + b - 0) \\ &= (aA + bA + bB - bA)/(a + b) \\ &= (aA + bB)/(a + b) \end{aligned}$$

For the calculation of a product composed of two numbers (A and B) followed by a division by a third number (C), the following values will be chosen as input parameter values:

$$x_1 = 0;\ x_2 = C;\ y_1 = 0;\ y_2 = B \text{ and } x = A.$$

Then, one effectively obtains by using the formula (1):

$$\begin{aligned} y &= 0 + (A - 0)(B - 0)/(C - 0) \\ &= AB/C. \end{aligned}$$

I claim:

1. A linear interpolation operator apparatus for determining a value of y, wherein y is a function of x, x is in a range between a known lower value $x_1$ and a known higher value $x_2$, and known values $y_1$ and $y_2$ correspond respectively to $x_1$ and $x_2$, comprising:

first calculation means for determining $(x_m+x_M)/2$, wherein the initial value of a lower range limit $x_m=x_1$ and the initial value of an upper range limit $x_M=x_2$;

said first calculation means comprising input registers, an adder and a divider by two;

second calculation means for determining $(y_m+y_M)/2$, wherein the initial value of a lower range limit $y_m=y_1$ and the initial value of an upper range limit $y_M=y_2$;

said second calculation means comprising input registers, an adder and a divider by two;

input means for inputting x;

comparing means for comparing x with $(x_m+x_M)/2$, said comparing means comprising a comparator including a first input terminal coupled to said divider by two of said first calculation means, a second input terminal coupled to said input means and an output;

feedback means responsive to the output of said comparator for transmitting the output of said divider by two of each of said first and second calculation means to a respective input register to reset corresponding upper or lower range limits, said feedback means comprising controlling gates for transmitting said output of said divider by two as a function of the comparator output; and output means coupled to said divider by two of said second calculation means for providing the value y after a predetermined number of cycles.

2. A linear interpolation operator apparatus according to claim 1, wherein the same calculation means are repetitively cycled.

3. A linear interpolation operator apparatus according to claim 1, wherein said first and second calculation means, respectively, are pipe-line connected, the output of one calculation means being transmitted to the next calculation means.

4. A linear interpolation operator apparatus according to claims 1 to barycentric calculations, wherein the value $y=(aA+bB)/(A+B)$ is to be calculated, wherein the values of the parameters are chosen as follows:

$$x_1=0; x_2=a+b; y_1=A; y_2=B \text{ and } x=b$$

5. A linear interpolation operator apparatus according to any of claims 1, 2 and 3 to the calculation of the product of two numbers A and B divided by a third number C ($y=A*B/C$), wherein the values of the parameters are chosen as follows:

$$x_1=0; x_2=C; y_1=0; y_2=B \text{ and } x=A.$$

* * * * *